United States Patent
Polyudov

(10) Patent No.: US 8,230,210 B1
(45) Date of Patent: *Jul. 24, 2012

(54) INTERACTIVE FIRMWARE RECOVERY

(75) Inventor: Feliks Polyudov, Lilburn, GA (US)

(73) Assignee: America Megatrends, Inc, Norcross, GA (US)

( * ) Notice: Subject to any disclaimer, the term of this patent is extended or adjusted under 35 U.S.C. 154(b) by 63 days.

This patent is subject to a terminal disclaimer.

(21) Appl. No.: 12/720,268

(22) Filed: Mar. 9, 2010

Related U.S. Application Data

(63) Continuation of application No. 11/538,204, filed on Oct. 3, 2006, now Pat. No. 7,702,896.

(51) Int. Cl.
*G06F 15/177* (2006.01)
(52) U.S. Cl. .................. 713/2; 714/36; 717/168
(58) Field of Classification Search ........ 713/2; 714/36; 717/168
See application file for complete search history.

(56) References Cited

U.S. PATENT DOCUMENTS

| | | | |
|---|---|---|---|
| 6,941,452 | B2 | 9/2005 | Huang |
| 7,143,275 | B2 | 11/2006 | Cepulis et al. |
| 7,146,609 | B2 | 12/2006 | Thurstaon et al. |
| 7,702,896 | B1 | 4/2010 | Polyudov |
| 2001/0049783 | A1 | 12/2001 | Chen |
| 2003/0217358 | A1 | 11/2003 | Thurston et al. |
| 2004/0015941 | A1 | 1/2004 | Sekine |
| 2004/0076043 | A1 | 4/2004 | Boals et al. |
| 2006/0112386 | A1 | 5/2006 | Moon et al. |
| 2008/0126777 | A1 | 5/2008 | Chang et al. |

OTHER PUBLICATIONS

American Megatrends, "AMIBIOS8 Flash Update & BIOS Recovery Methods," Version 1.0, Jun. 19, 2003.
US Official Action mailed May 19, 2010 in U.S. Appl. No. 11/538,286.
US Official Action mailed Oct. 21, 2010 in U.S. Appl. No. 11/538,286.
Giga-byte Technology Co., GA-K8VT890 AMD Socket 754 Processor Motherboard User's Manual, Rev. 1001, Jun. 10, 2005, pp. 1-80.
Giga-byte Technology Co., Q-Flash Quick Flash BIOS Utility User's Manual, pp. 1-17.
US Notice of Allowance/Allowability dated Feb. 9, 2011 in U.S. Appl. No. 11/538,286.
Dell OpenManage™ Server Update Utility 1.1—User's Guide, Apr. 2005.
U.S. Appl. No. 11/538,286, entitled "Interactive Firmware Update" filed Oct. 3, 2006, Inventor: Feliks Polyudov.
U.S. Official Action dated Apr. 2, 2009 in U.S. Appl. No. 11/538,286.
U.S. Official Action dated Nov. 24, 2009 in U.S. Appl. No. 11/538,286.
U.S. Official Action dated Apr. 1, 2009 in U.S. Appl. No. 11/538,204.
U.S. Notice of Allowance / Allowability dated Nov. 23, 2009 in U.S. Appl. No. 11/538,204.

*Primary Examiner* — Albert Wang
(74) *Attorney, Agent, or Firm* — Hope Baldauff Hartman, LLC

(57) ABSTRACT

Firmware is interactively recoverable prior to loading an operating system on a computer. Rather than proceeding through a recovery without user input, user input about a recovery is solicited after determining that an update is needed. Prior to recovering the firmware, users may be able to, for example, specify configuration options about the recovery, cancel the update altogether, and specify a firmware image location. Once input is received, the firmware recovery proceeds.

20 Claims, 8 Drawing Sheets

INTERACTIVE FIRMWARE RECOVERY

CROSS-REFERENCE TO RELATED APPLICATIONS

This application is a continuation of U.S. patent application Ser. No. 11/538,204 filed Oct. 3, 2006, entitled "Interactive Firmware Recovery", now U.S. Pat. No. 7,702,896 which is incorporated herein by reference. U.S. Pat. No. 7,702,896 is related to U.S. Pat. No. 7,762,736 issued on Jun. 14, 2011, entitled "Interactive Firmware Update", which is incorporated herein by reference.

BACKGROUND

Many computer systems utilize a firmware program stored in non-volatile memory to assist with the start up of the computer and to enable communication with low level hardware. For instance, many personal computer systems utilize a basic input/output system (BIOS) and/or additional firmware that includes program code containing fundamental routines that help transfer information between elements within the computer. In many computer systems, the firmware is stored as groups of memory blocks in one or more non-volatile memory devices. From time to time, it may be necessary to update firmware such as, for instance, when a newer version of the firmware is available. It may also be necessary to recover a previous firmware version, such as when the current firmware is somehow corrupted.

The updating of firmware previously occurred in an automated fashion. This may occur at the behest of a management agent installed on the computer or on another computer connected via a network, or at the behest of the firmware itself, for example, when code determines that the firmware has been corrupted and a recovery may be required. A user may alternatively invoke a firmware update using a special keyboard combination, a jumper or switch, or some other form of manual intervention. However, once invoked, an update proceeds without permitting user input or providing feedback on progress.

The delay inherent in a firmware update can lead to the computer appearing to be frozen, with no screen updates and no response from input devices such as an attached keyboard. This delay prompted many users to power down their computers thinking the system had frozen or crashed. Powering down a computer during firmware update may cause unintended problems, or at least needlessly slow progress. In addition to a lack of feedback, existing update and recovery processes do not permit a user to configure the process, to cancel or rollback an update, or to otherwise control the process.

It is with respect to these considerations and that the embodiments of the present invention have been made.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Provided are methods for recovering firmware instructions. The method includes determining that a firmware recovery is needed prior to loading an operating system, receiving user input prior to loading the operating system, and updating the firmware instructions in accordance with the input.

Also provided are computer-readable media with computer-executable instructions, including launching a firmware setup utility when it's determined that a firmware recovery is needed, displaying a recovery page in the setup utility, and the receiving input from a user for proceeding with the firmware recovery.

Also provided are systems for recovering computer firmware, including two modules. A recovery module determines the need for a firmware recovery, receives input needed to perform the recovery, and performs the recovery itself. A setup module displays information about the firmware recovery on a display, displays the input needed, and receives the input from a user.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

Figure 1:
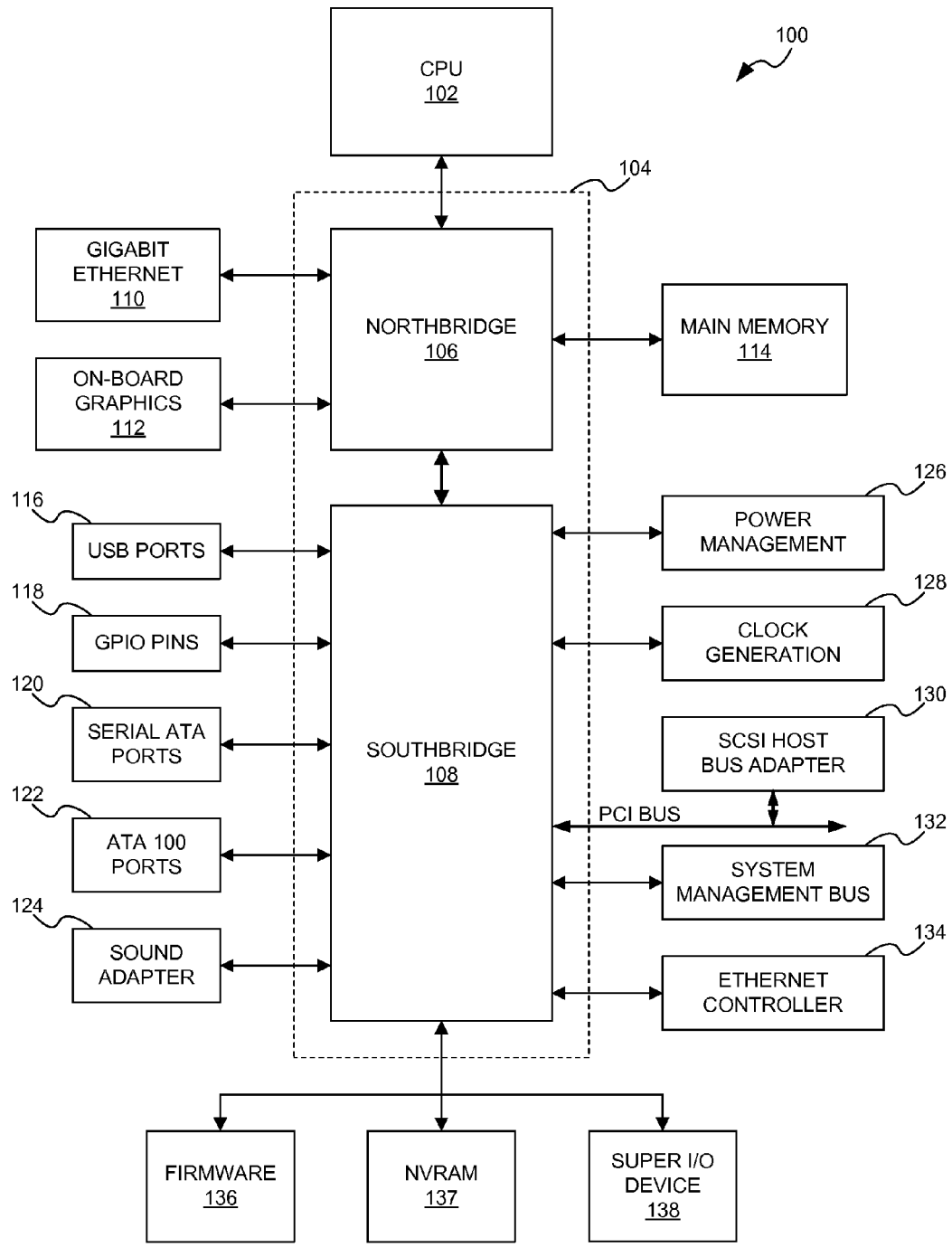
FIG. 1 is a computer architecture diagram that illustrates various components of a computer that provides an illustrative operating environment.

The following detailed description is directed to apparatuses and methods for interactively recovering and updating firmware on a computer. In the following detailed description, references are made to the accompanying drawings that form a part hereof, and which are shown, by way of illustration, using specific embodiments or examples. Referring now to the drawings, in which like numerals represent like elements through the several figures, aspects of the various implementations and an illustrative operating environment provided herein will be described.

FIG. 1 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments presented herein will be described. It should be appreciated that although the embodiments described herein are discussed in the context of a conventional desktop or server computer, virtually any type of computing device may be utilized. FIG. 1 shows an illustrative computer architecture for a computer 100 that is operative to interactively recover or update an installed firmware.

In order to provide the functionality described herein, the computer 100 includes a baseboard, or "motherboard", which is a printed circuit board to which a multitude of components or devices may be connected by way of a system bus or other communication path. In one illustrative embodiment, a CPU 102 operates in conjunction with a chipset 104. The CPU 102 is a standard central processor that performs arithmetic and logical operations necessary for the operation of the computer. The computer 100 may include a multitude of CPUs 102.

Chipset 104 includes a northbridge 106 and a southbridge 108. Northbridge 106 provides an interface between CPU 102 and the remainder of computer 100. Northbridge 106 also provides an interface to a random access memory (RAM) used as a main memory 114 in computer 100 and, possibly, to an on-board graphics adapter 112. Northbridge 106 may also include functionality for providing networking functionality through a gigabit Ethernet adapter 110. Gigabit Ethernet adapter 110 is capable of connecting computer 100 to one or more other computers via a network. Connections which may be made by adapter 110 may include local area network (LAN) or wide area network (WAN) connections. LAN and WAN networking environments are commonplace in offices, enterprise-wide computer networks, intranets, and the Internet. Northbridge 106 is connected to southbridge 108.

Southbridge 108 is responsible for controlling many of the input/output functions of computer 100. In particular, southbridge 108 may provide one or more universal serial bus (USB) ports 116, a sound adapter 124, an Ethernet controller 134, and one or more general purpose input/output (GPIO) pins 118. Southbridge 108 may also provide a bus for interfacing peripheral card devices such as a SCSI host bus adapter 130. In one embodiment, the bus comprises a peripheral component interconnect (PCI) bus. Southbridge 108 may also provide a system management bus 132 for use in managing the various components of computer 100. Power management circuitry 126 and clock generation circuitry 128 may also be utilized during the operation of southbridge 108.

Southbridge 108 is also operative to provide one or more interfaces for connecting mass storage devices to computer 100. For instance, according to an embodiment, southbridge 108 includes a serial advanced technology attachment (SATA) adapter for providing one or more serial ATA ports 120 and an ATA100 adapter for providing one or more ATA100 ports 122. Serial ATA ports 120 and ATA100 ports 122 may be, in turn, connected to one or more mass storage devices storing an operating system and application programs and other data. As known to those skilled in the art, an operating system comprises a set of programs that control operations of a computer and allocation of resources. An application program is software that runs on top of the operating system software, or other runtime environment, and uses computer resources to perform application specific tasks desired by a user of computer 100.

The mass storage devices connected to the southbridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a Super I/O device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a NVRAM 137 for storing the firmware 136 that includes program code containing the basic routines that help to start up the computer 100 and to transfer information between elements within the computer 100. Firmware 136 may include a firmware that is compatible with the Extensible Firmware Interface (EFI) specification. It should be appreciated that in addition to firmware 136 including an EFI-compatible firmware, other types and combinations of firmware may be included. For instance, firmware 136 may comprise a Basic Input and Output System (BIOS) firmware or other type of firmware known to those in the art. Additional details regarding the operation of the EFI firmware 136 are provided below with respect to FIGS. 2 and 3.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
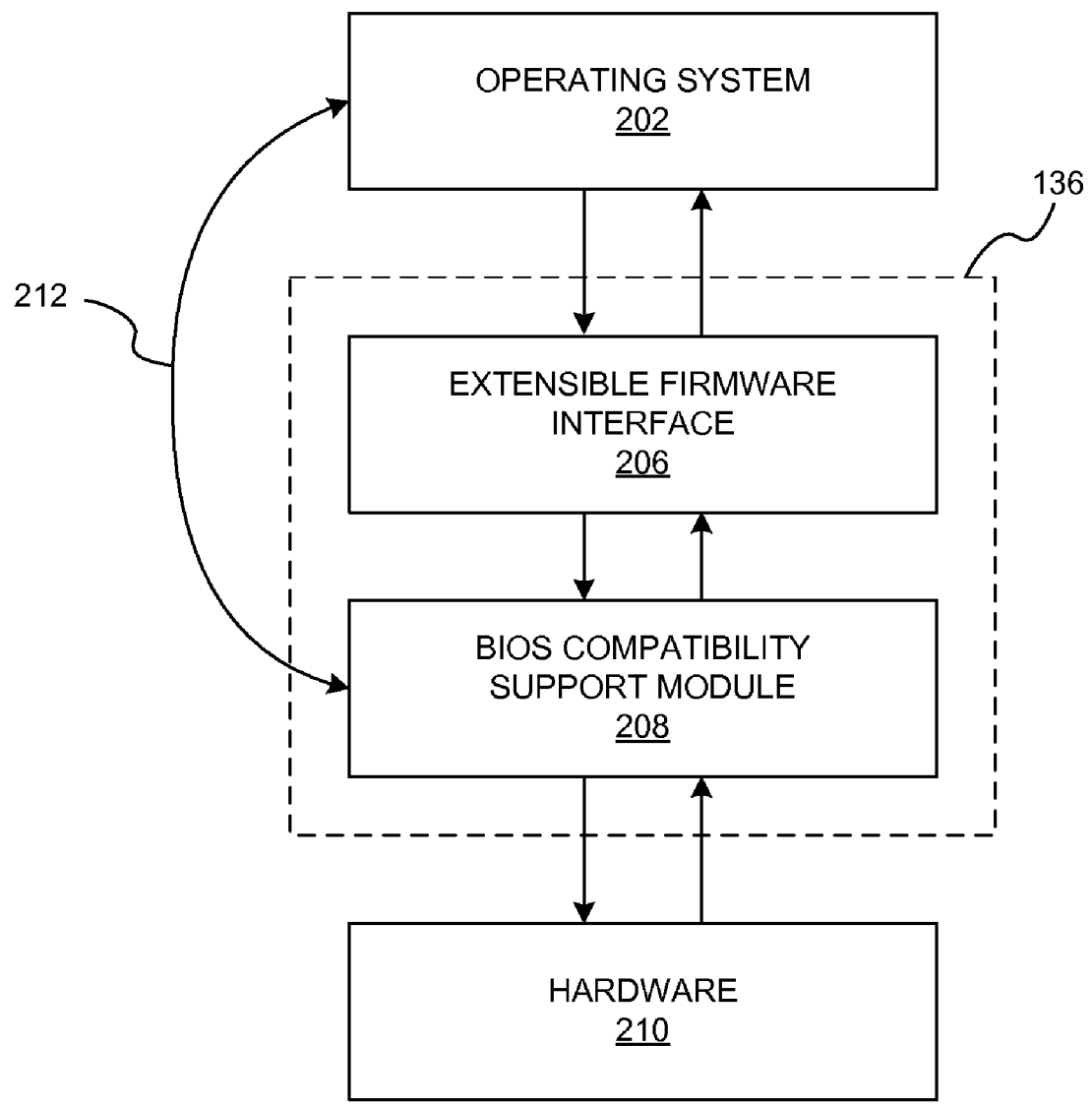
FIGS. 2 and 3 are computer architecture diagrams that illustrate aspects of an Extensible Firmware Interface (EFI) environment that may be utilized by implementations.

Referring now to FIG. 2, additional details regarding the operation of the EFI firmware 136 of the computer 100 will be described. In most computing systems, low level instruction code is used as an intermediary between the hardware components of the computing system and the operating software and other high level software executing on the computing system. In some computer systems, this low-level instruction code is known as BIOS 208. BIOS 208 may provide a set of software routines that allow higher-level software to interact with the hardware 210 of the computing system using standard calls.

Because of limitations of the BIOS in many computers, a new specification for creating the firmware that is responsible for booting the computer and for intermediating the communication between the operating system and the hardware has been created. The specification is called the Extensible Firmware Interface (EFI) specification, which was originally created by INTEL CORPORATION and which is also being extended by the UNIFIED EXTENSIBLE FIRMWARE INTERFACE FORUM (UEFI).

The EFI specification describes an interface 206 between operating system 202 and firmware 136. In particular, the specification defines the interface that platform firmware must implement and the interface that the operating system may use in booting and accessing hardware. How the firmware implements the interface is left up to the manufacturer of the firmware. The EFI specification provides protocols for EFI drivers to communicate with each other, and the EFI core provides functions such as allocation of memory, creating events, setting the clock, and many others.

As described above, firmware 136 may include a firmware compatible with the EFI specification from INTEL CORPORATION or from the UEFI FORUM. The specification defines a way for the operating system 202 and firmware 136 to communicate only information necessary to support the operating system boot process. This may be accomplished through a formal and complete abstract specification of the software-visible interface presented to the operating system by the platform and the firmware.

According to one implementation of EFI on INTEL CORPORATION IA-32 platforms, both EFI 206 and a BIOS 208 may be present in firmware 136. This allows users and system integrators to support both firmware interfaces. In order to provide this functionality, an interface 212 may be provided for use by legacy operating systems and applications. Additional details regarding the architecture and operation of EFI 206 are provided below with respect to FIG. 3. Moreover, additional details regarding the operation and architecture of EFI can be found in either version 1.10 of the EFI specification available from INTEL CORPORATION and/or version 2.0 of the UEFI specification available from the UEFI FORUM, both of which are expressly incorporated herein by reference.

A portion of non-volatile storage may be set aside as a boot block (not shown). The boot block may constitute, for example, a block of memory in NVRAM 137 which may be difficult or impossible to update. The boot block may include a reduced set of computer instructions which, when executed, check the firmware 136 to ensure that the instructions stored therein are not corrupted or otherwise modified, and then appropriately update, recover, load, and/or execute some portion of firmware 136.

Figure 3:
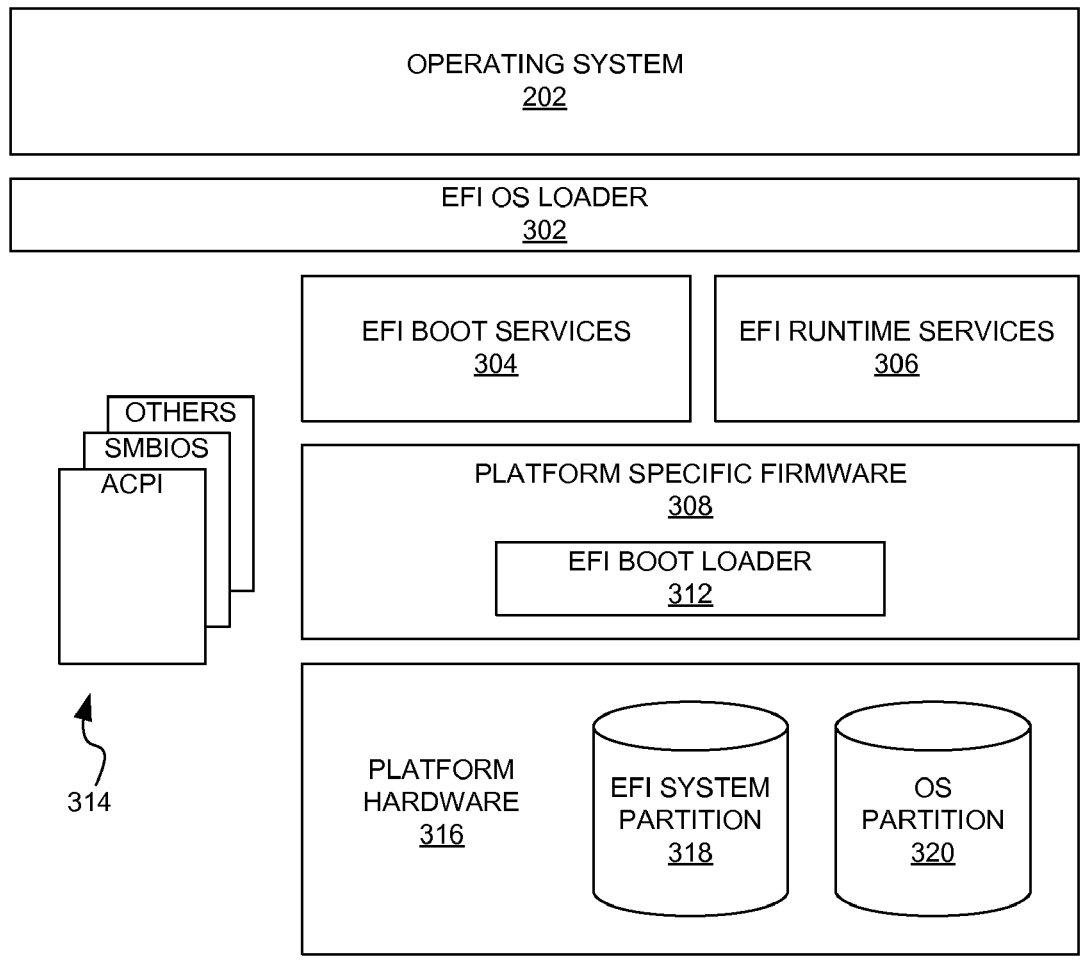

Turning now to FIG. 3, additional details regarding an EFI specification-compliant system which may be utilized to provide an operating environment for the various implementations presented herein will be described. As shown in FIG. 3, the system includes platform hardware 316 and an operating system (OS) 202. The platform firmware 308 may retrieve an OS image from the EFI system partition 318 using an EFI OS loader 302. The EFI system partition 318 may be an architecturally shareable system partition. As such, the EFI system partition 318 defines a partition and file system that are designed to allow safe sharing of mass storage between multiple vendors. An OS partition 320 may also be utilized.

Once started, the EFI OS loader 302 continues to boot the complete operating system 202. In doing so, the EFI OS loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 may also be available to the OS loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order. It should be appreciated that both operating system 202 and firmware 136 may provide a runtime environment for application programs as described herein.

Figure 4:
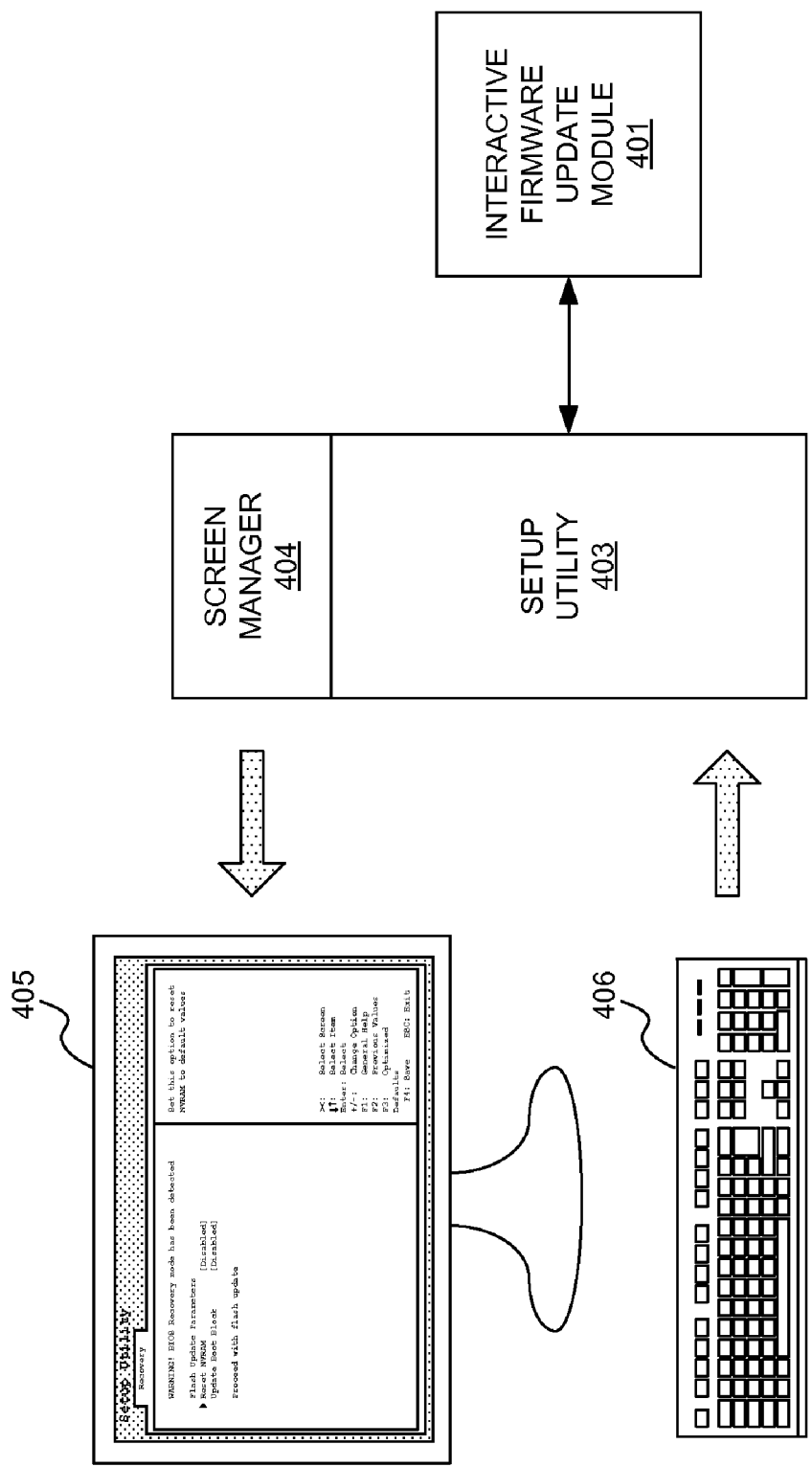
FIG. 4 depicts program modules which may be utilized as part of a computer boot process.

FIG. 4 depicts program modules which may be utilized as part of the boot process of computer 100. During a boot process, a setup utility 403 may be initiated prior to the loading of an operating system 202. Setup utility 403 may be initiated at the behest of a user (e.g., depressing a special key or combination of keys), at the behest of a management agent stored on computer 100 or on another computer connected by a network, and/or at the behest of the instructions stored in firmware 136 itself. In the latter situation, a power-on self-test (POST) may be performed which may verify the integrity of the instructions stored in firmware 136. This may include evaluating the instructions stored on firmware 136 to determine whether they have been corrupted or modified inappropriately. If it is found that firmware 136 is lacking integrity, setup utility 403 may be initiated without external intervention.

Setup utility 403 may include and/or may otherwise work with screen manager 404. Setup utility 403 may receive and process input from a user via, for example, a keyboard 406. Setup utility 403, in conjunction with screen manager 404, may display information and options on a display 405. The combination of input and output may allow a user to configure setup options, or otherwise work interactively with setup utility 403.

An interactive firmware update module 401 may include instructions which work in conjunction with setup utility 403, screen manager 404, and other code stored on computer 100. Interactive firmware update module 401 may allow a user to interact with an executing firmware update, providing information to the user via display 405, and receiving selections and commands via input devices such as keyboard 406. Interactive firmware update module 401, or other code stored on computer 100, may access a new firmware image and either execute or extract portions of the new firmware image. The firmware image may include instructions which call or interact with setup utility 403 and/or screen manager 404. In additional embodiments, interactive firmware update module 401 may be stored in or otherwise accessed from a new firmware image.

Figure 5:
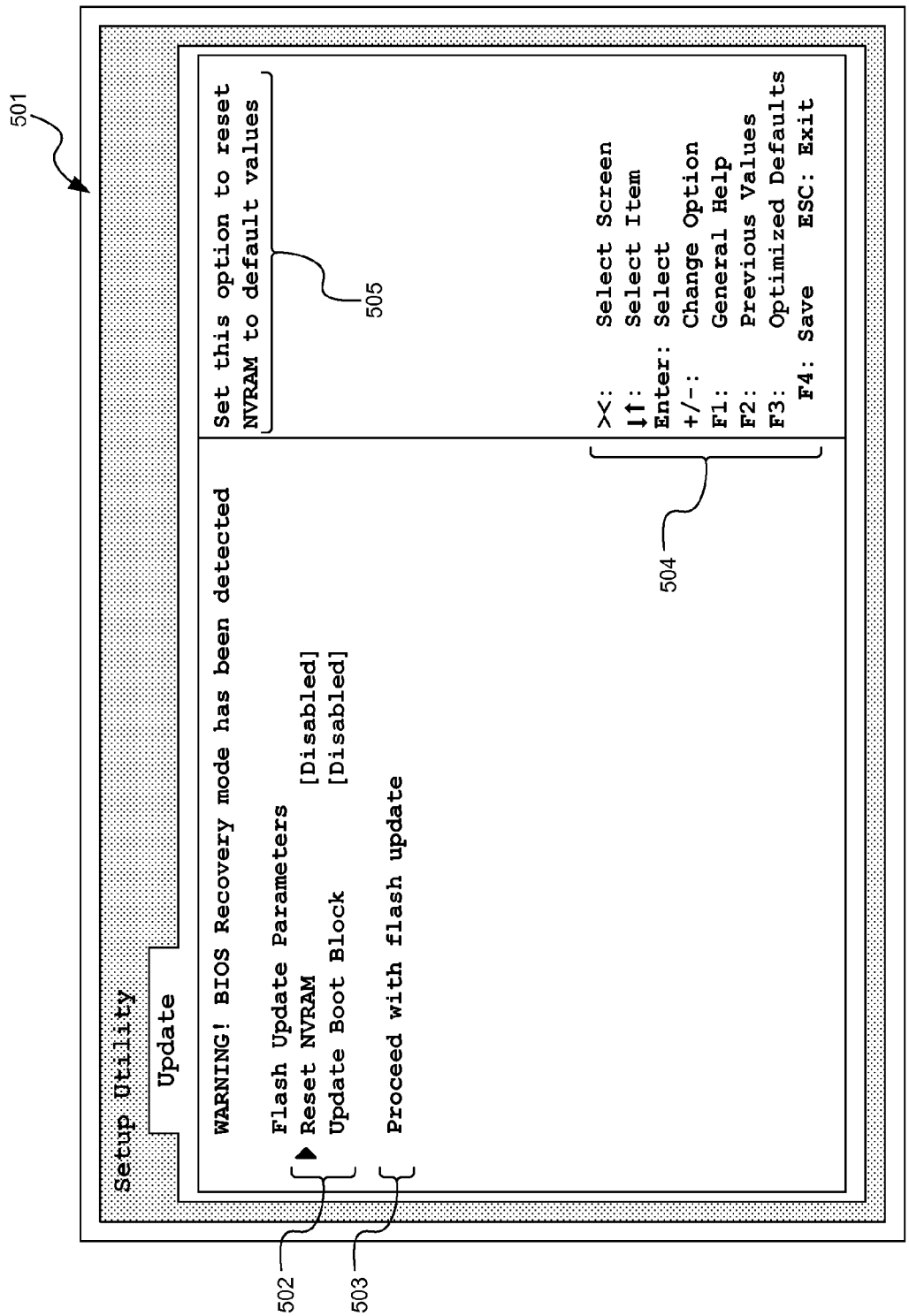
FIGS. 5 and 6 depict examples of a display as provided by interactive firmware update.

FIG. 5 depicts an example of a display 501 as provided by interactive firmware update module 401 in conjunction with setup utility 403 and screen manager 404. Display 501 may be shown during a computer's boot operation. Display 501 shows that computer 100 has detected a recovery condition. It should be noted that although the example here applies specifically to an EFI recovery, other instructions stored in the firmware may be the subject of a recovery or an update. Display 501 includes a set of options 502 that a user can manipulate using an input device, as well as a proceed instruction 503, which enables the user to initiate a recovery once the user is satisfied with the options. In addition, setup utility 403 may provide a description 505 of a currently selected option, as well as input instructions 504 which instruct the user about manipulating the options. By providing display 501, a user may control the specifics of the recovery, and also may control its progress. In some embodiments, a user may be unable to configure options or control progress when, for example, the recovery was triggered by an administrator who wishes to limit interactivity by an end user.

When a user is shown display 501, the user may direct or move a cursor and select an option, modify it, and then proceed to another option. Options may include, for example, resetting BIOS, EFI, or other configuration options; updating the boot block in addition to the remainder of the firmware; ignoring the recovery condition; and booting the operating system using a new firmware image without performing an update. In addition to setting options for the impending recovery, a user may be able to perform other functions prior to performing the recovery, including, for example, testing the old firmware image, and testing the new firmware image. Additional options and functions may enable the user to select and/or download a new firmware image from a remote computer via a network connection prior to performing an update.

Figure 6:
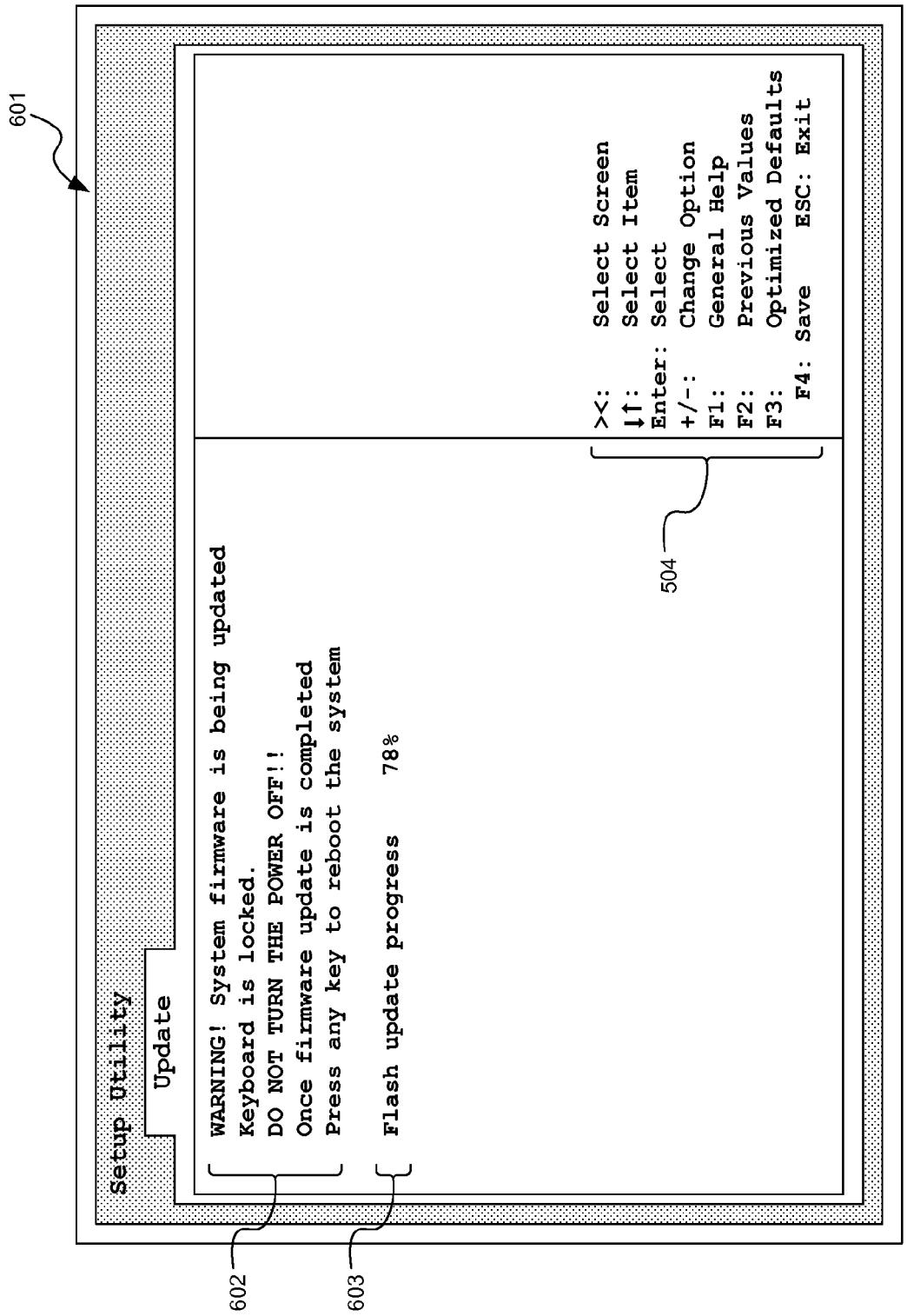

FIG. 6 depicts a display 601 similar to display 501 of FIG. 5, including input instructions 504. Display 601 informs a user as to the ongoing progress of an update or recovery. As such, a user will not mistakenly believe that computer 100 has frozen because a progress message 603 is refreshed during the update. Both displays 501 and 601 may be generated with the assistance of setup utility 403 and/or screen manager 404, or with another software module not requiring an operating system to be loaded. Display 601 may be shown immediately following a selection made by the user on display 501. Alternatively, display 601 may be shown independently, such as in the case where no options may be available for the update or recovery, when the update or recovery is determined not to be interactive, or in any situation where firmware is being updated.

Display 601 may include a warning message 602 and an updated progress message 603. Warning message 602 may be used to remind the user not to power down or otherwise disrupt computer 100 during the update or recovery. Progress message 603 is repeatedly updated so as to show the user that the firmware update or recovery is progressing. Details will be provided below with respect to FIG. 8 as to how progress message 603 may be generated and displayed.

Figure 7:
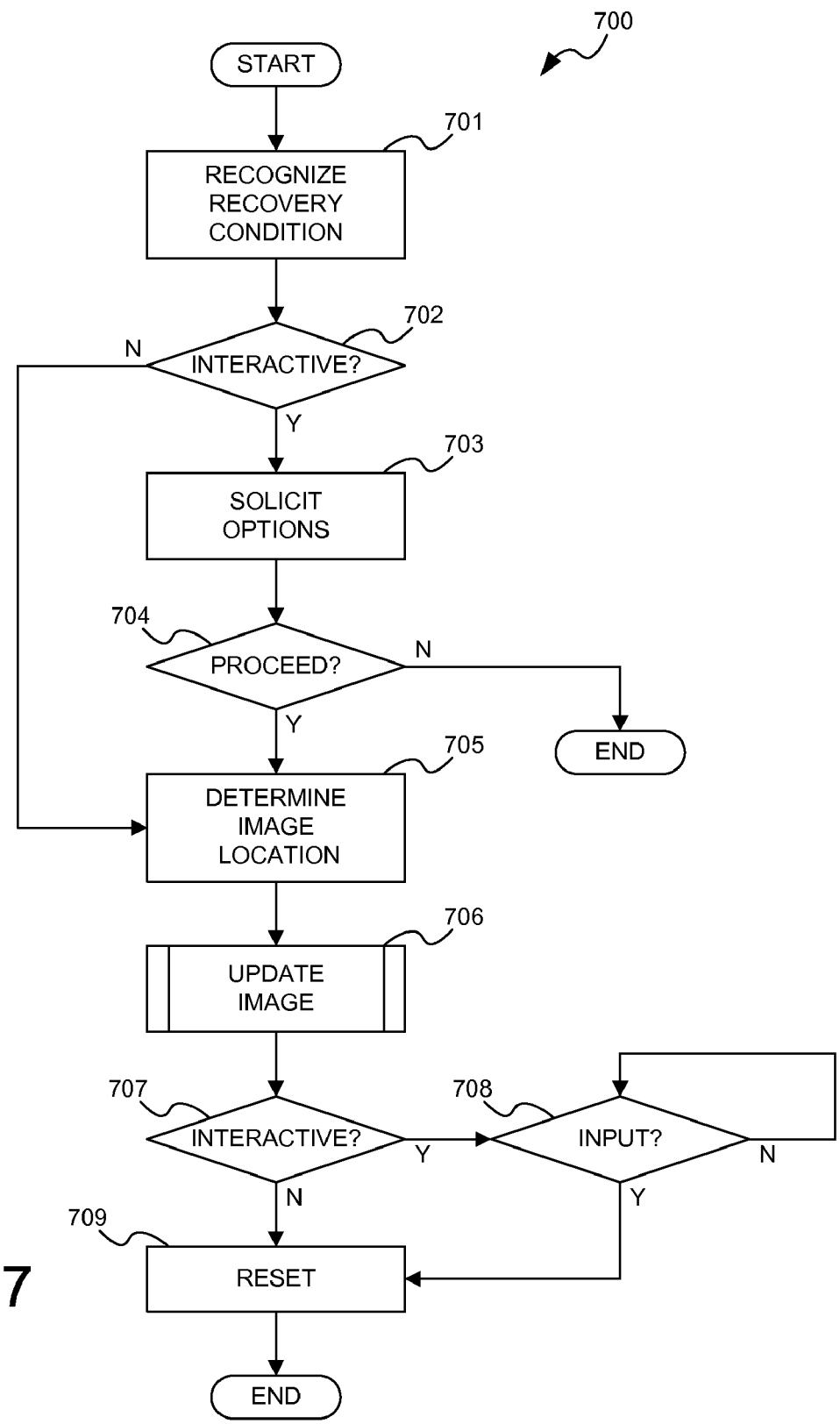
FIGS. 7 and 8 are both flow diagrams illustrating examples of processes for providing interactive firmware updates.

FIG. 7 is a flow diagram illustrating an example of a process for providing an interactive firmware recovery. The logical operations of the various implementations presented, including those of FIGS. 7 and 8, may be (1) a sequence of computer implemented acts or program modules running on computer 100 and/or (2) interconnected machine logic circuits or circuit modules within computer 100. The implementation is a matter of choice dependent on the performance requirements of the computer on which the embodiments are implemented. Accordingly, the logical operations making up the implementations are referred to variously as operations, structural devices, acts, or modules. It will be recognized by one skilled in the art that these operations, structural devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

Routine 700 begins with operation 701, which involves determining that a recovery is to be initiated. Determining the need for a recovery may be accomplished by determining, for example, that the current firmware image has been corrupted; or that a remote computer connected to computer 100 via a network has requested a recovery. At decision 702, the firmware update routine determines whether the recovery is to be conducted in an interactive fashion. This determination may be made in a number of ways. Interactivity may be an option set by a user of computer 100, or by a local or remote management agent. Actions preceding a recovery may also determine interactivity. For example, if a user powered up computer 100 manually, and it is determined that a recovery is needed, the process may automatically decide that the update is interactive. Alternatively, if a remote computer initiated the recovery, then the recovery may proceed automatically without interactivity. Additionally, interactivity may be determined depending on the level of firmware corruption detected. If, for example, corruption is minimal, a user may be presented with more options to configure and/or diagnose the issue. However, if the corruption is severe, a recovery may proceed without interactivity.

If a recovery is determined to be non-interactive, then the recovery procedure continues at operation 705. If otherwise a recovery is determined to be interactive, then at operation 703, the computer solicits the entry of options to configure the firmware recovery procedure. Options may be solicited by showing them on display 405, and receiving input from a user via keyboard 406. Options on display 405 may be shown by providing option information to setup utility 403. For example, when a recovery condition is determined, information about recovery interactivity (e.g., configuration options and progress feedback) may be placed in a table or similar data structure. When setup utility 403 executes, it may retrieve this information and display recovery page 501.

Other methods for providing information about options and receiving input may be available. Once input is received regarding options, information about the input may be stored for use during the recovery procedure. Soliciting input may include requesting that a user press a key before proceeding. At operation 704, it is determined whether the recovery procedure should proceed. This may be determined based on user input, or based on one or more selected options. The firmware recovery procedure may exit at this point without performing the update. Otherwise, the recovery proceeds.

At operation 705, the location of a new firmware image is located. The new firmware image refers to a set of computer instructions stored somewhere outside the firmware which may be used to update the firmware. Either partial or full firmware updates may be stored in the new firmware image. The image may be stored in the memory of computer 100, on a non-volatile storage medium (e.g., a hard drive or USB drive) associated with computer 100, or on a remote computer connected via a network connection. At operation 706, the firmware update operation occurs. The firmware update operation may involve copying the firmware image from one location to another and/or overwriting an outdated or corrupted set of instructions. In some embodiments, the firmware update operation may involve utilizing the interactive process depicted in FIG. 8.

Upon completion of an update operation, at decision 707, again depending on whether the recovery procedure is intended to be interactive or not, additional input may be requested. This may be a request to confirm or commit the update and/or to press a key to continue. If interactive, once input is received at decision 708, then at operation 709, computer 100 may be reset, or the firmware will otherwise be restarted with the new firmware image installed.

Figure 8:
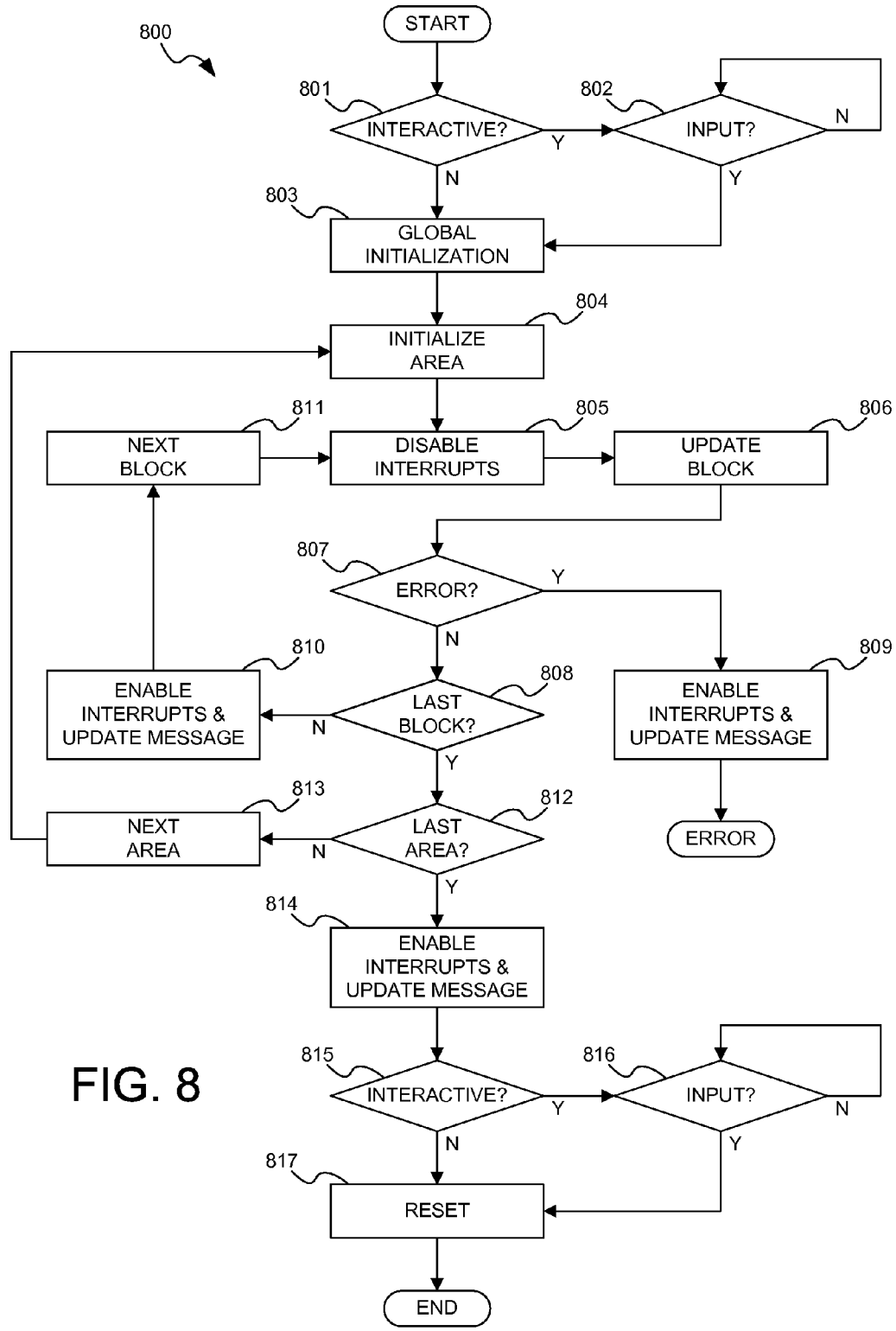

FIG. 8 is a flow diagram illustrating an example of a process for providing interactive firmware updates. The routine 800 depicted in this example may or may not work as part of the process 700 set forth above. In other words, routine 800 may be used in the handling of update operation 706. At decision 801, interactivity is determined in any of a number of ways, but does not necessarily need to be determined in the same fashion as the interactivity determined at decision 702. At decision 802, if interactive, an input may be waited on before proceeding. The input may merely be a depressed key signaling that the update should begin. At operation 803, a global initialization occurs, wherein variables and procedures are initialized prior to beginning the actual update. Global initialization 803 may determine the number of blocks and/or areas to be updated, and may also determine the location of the firmware image. Other calculations may be determining an address delta between a ROM address and a RAM address. In addition, the keyboard (or other input device) may be locked, and warning message 602 may be initialized. Other initialized variables may include a progress message. The progress message may be stored as a string of characters.

At operation 804, initialization specific to an area of the firmware image occurs. An area may represent a subdivision of the firmware image, although the image may be stored within a single area. An area may include one or more blocks of data. A first block within the area may also be determined during operation 804, and the previously determined address delta used to determine a location for the block. At operation 805, interrupts may be disabled, preventing their disturbing the block update at operation 806. During operation 806, the block may be copied into firmware, or elsewhere in memory. Also, during block update 806, interrupts may be selectively re-enabled and the keyboard selectively unlocked.

If, at decision 807, there was an error during a block update, then at operation 809, interrupts are enabled and the progress message may be updated to reflect the error. In addition, during operation 809, an error recovery routine may be activated, one which may, for example, replace previously stored firmware and override the update. In addition, the keyboard is unlocked. If there are no errors at decision 807, and this is not the last block within the area at decision 808, then at operation 810, interrupts may be enabled, and the progress message may be updated to reflect further progress towards updating the firmware. The updated message may reflect an additional percentage of the area or firmware being completed. Proceeding to the next block at operation 811, interrupts are once again disabled at operation 805. The period between re-enabling and disabling interrupts may allow a separate process or set of instructions to interrupt the ongoing firmware update. Such an interrupt may include a setup utility 403 or screen manager 404 interrupting or calling back to retrieve or access the most recent progress message. Likewise, the updated progress message may be pushed by the firmware update routine to update the screen without necessarily using an interrupt.

In some embodiments, setup utility 403 may make periodic calls to the interactive firmware update module during the firmware update. These calls from the setup utility may be immediately handled, may be deferred, or may be ignored by the interactive firmware update module. When handling these calls, the interactive firmware update module may put the ongoing update operation on hold and then update the progress message. The update module may then return control to setup utility 403, which can then utilize screen manager 404 to update the progress message shown on display 405. The setup utility may then make a call to the interactive firmware update module to resume the update.

Returning to decision 808, if this is the last block in the current area, and at decision 812, this is not the last area, then at operation 813, the next area is determined, and the new area is initialized for update at operation 804. If this is the last block of the last area at decision 812, then at operation 814, interrupts may be enabled, the progress message may be updated, and the keyboard is unlocked. At decision 815, if the update is intended to be interactive, then at decision 816, some input (e.g., "Press a key to restart computer.") is awaited. At operation 817, the computer is reset, causing it to use the newly updated firmware.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for recovering a plurality of firmware instructions, the method comprising:
   determining whether the plurality of firmware instructions need recovery prior to loading an operating system on a computer;
   in response to determining that the plurality of firmware instructions need recovery, determining whether recovery of the firmware instructions is to be conducted in an interactive fashion;
   in response to determining that recovery of the firmware instructions is to be conducted in an interactive fashion, soliciting a user to supply an input regarding the recovery prior to loading the operating system, receiving the input from the user, and updating the plurality of firmware instructions in accordance with the input; and
   in response to determining that recovery of the firmware instructions is not to be conducted in an interactive fashion, updating the plurality of firmware instructions without receiving user input.

2. The method of claim 1, wherein soliciting a user to supply an input regarding the update prior to loading the operating system comprises displaying an option for modification.

3. The method of claim 2, wherein the option comprises a parameter for specifying whether a plurality of options should be reset to default values during the updating of the plurality of firmware instructions.

4. The method of claim 2, wherein the option comprises a parameter for specifying whether contents of a boot block should be updated during the updating of the plurality of firmware instructions.

5. The method of claim 1, further comprising:
   launching a firmware setup utility prior to loading the operating system; and displaying a recovery page using the setup utility prior to soliciting the user to provide an input.

6. The method of claim 5, further comprising:
displaying a repeatedly updated visual indicator of progress while updating the plurality of firmware instructions.

7. The method of claim 1, wherein determining whether recovery of the firmware instructions is to be conducted in an interactive fashion comprises:
determining whether a user powered up the computer; and
conducting the recovery of the firmware instructions in an interactive fashion if the user powered up the computer.

8. The method of claim 1, wherein determining whether recovery of the firmware instructions is to be conducted in an interactive fashion comprises:
determining whether a remote computer initiated the recovery; and
conducting the recovery of the firmware instructions without receiving user input if the remote computer initiated the recovery.

9. The method of claim 1, wherein determining whether recovery of the firmware instructions is to be conducted in an interactive fashion comprises:
determining a level of corruption of the firmware instructions;
conducting the recovery of the firmware instructions without interactivity if the level of corruption of the firmware instructions is severe; and
conducting the recovery of the firmware instructions with interactivity if the level of corruption of the firmware instructions is minimal.

10. A non-transitory computer-readable medium having computer-executable instructions stored thereon which, when executed by a computer, cause the computer to:
determine whether a recovery of a computer firmware of the computer is needed; and
in response to determining that a recovery of the computer firmware is needed, to determine whether recovery of the firmware is to be conducted in an interactive fashion, to display a recovery page for soliciting input regarding the recovery from a user in response to determining that recovery of the firmware is to be conducted in an interactive fashion, to receive input from the user by way of the recovery page, to recover the computer firmware in accordance with the input, and to recover the computer firmware without soliciting input from the user in response to determining that the recovery of the firmware is not to be conducted in an interactive fashion.

11. The computer-readable medium of claim 10, wherein displaying the recovery page comprises displaying a configuration option for configuring the recovery.

12. The computer-readable medium of claim 11, wherein the configuration option comprises a parameter for specifying whether configuration data stored in non-volatile memory should be reset.

13. The computer-readable medium of claim 11, wherein the configuration option comprises a parameter for specifying whether a boot block should be updated.

14. The computer-readable medium of claim 10, having further computer-executable instructions stored thereupon which, when executed by the computer, cause the computer to:
display a repeatedly updated visual indicator of progress while proceeding with the recovery of the computer firmware.

15. The computer-readable medium of claim 10, wherein the instructions are all executed prior to the loading of an operating system.

16. The computer-readable medium of claim 10, wherein determine whether recovery of the firmware instructions is to be conducted in an interactive fashion comprises:
determining whether a user powered up the computer; and
conducting the recovery of the firmware instructions in an interactive fashion if the user powered up the computer.

17. The computer-readable medium of claim 10, wherein determine whether recovery of the firmware instructions is to be conducted in an interactive fashion comprises:
determining whether a remote computer initiated the recovery; and
conducting the recovery of the firmware instructions without receiving user input if the remote computer initiated the recovery.

18. The computer-readable medium of claim 10, wherein determine whether recovery of the firmware instructions is to be conducted in an interactive fashion comprises:
determining a level of corruption of the firmware instructions;
conducting the recovery of the firmware instructions without interactivity if the level of corruption of the firmware instructions is severe; and
conducting the recovery of the firmware instructions with interactivity if the level of corruption of the firmware instructions is minimal.

19. A computer system configured for interactive recovery of a firmware, the computer system comprising:
one or more central processing units; and
a non-volatile memory device having instructions stored thereupon which, when executed on the one or more central processing units, cause the computer system
to determine whether the firmware needs recovery prior to loading an operating system on the computer system,
to determine whether recovery of the firmware is to be conducted in an interactive fashion in response to determining that the firmware needs recovery,
in response to determining that recovery of the firmware is to be conducted in an interactive fashion, to solicit a user to supply an input regarding the recovery prior to loading the operating system, to receive the input from the user, to update the firmware in accordance with the input, and
to update the firmware without receiving user input in response to determining that recovery of the firmware is not to be conducted in an interactive fashion.

20. The computer system of claim 19, wherein the non-volatile memory device has further computer-executable instructions stored thereupon which, when executed by the one or more central processing units, causes the computer system to repeatedly update a display of a progress message while performing recovery of the firmware.

* * * * *